US010349201B2

(12) United States Patent
Baek et al.

(10) Patent No.: US 10,349,201 B2
(45) Date of Patent: Jul. 9, 2019

(54) APPARATUS AND METHOD FOR PROCESSING AUDIO SIGNAL TO PERFORM BINAURAL RENDERING

(71) Applicant: Gaudio Lab, Inc., Los Angeles, CA (US)

(72) Inventors: Yonghyun Baek, Seoul (KR); Hyunoh Oh, Seongnam-si (KR); Taegyu Lee, Seoul (KR); Jeonghun Seo, Seoul (KR); Sewoon Jeon, Daejeon (KR)

(73) Assignee: Gaudio Lab, Inc., Los Angeles, CA (US)

( * ) Notice: Subject to any disclaimer, the term of this patent is extended or adjusted under 35 U.S.C. 154(b) by 4 days.

(21) Appl. No.: 15/586,297

(22) Filed: May 4, 2017

(65) Prior Publication Data

US 2017/0325045 A1 Nov. 9, 2017

(30) Foreign Application Priority Data

May 4, 2016 (KR) ........................ 10-2016-0055791

(51) Int. Cl.
*G06F 17/00* (2019.01)
*H04S 7/00* (2006.01)
*H04S 1/00* (2006.01)

(52) U.S. Cl.
CPC .............. *H04S 7/303* (2013.01); *H04S 1/002* (2013.01); *H04S 2400/01* (2013.01); *H04S 2420/01* (2013.01)

(58) Field of Classification Search
CPC ...... H04S 2420/01; H04S 7/303; H04S 1/002; H04S 2400/01
See application file for complete search history.

(56) References Cited

U.S. PATENT DOCUMENTS 6,498,857 B1 * 12/2002 Sibbald ..................... H04S 7/30
381/1

FOREIGN PATENT DOCUMENTS

| | | | | |
|---|---|---|---|---|
| KR | 10-2001-0057764 A | | 7/2001 | |
| KR | 10-2011-0082553 A | | 7/2011 | |
| KR | 10-2015-0013073 A | | 2/2015 | |
| KR | 10-2015-0110093 A | | 10/2015 | |
| WO | 2015/102920 A1 | | 7/2015 | |
| WO | WO 2015127890 A1 | * | 9/2015 | H04S 7/30 |

OTHER PUBLICATIONS

International Search Report and Written Opinion of the International Searching Authority dated Jul. 24, 2017 for Application No. PCT/KR2017/004641 with English translation.

* cited by examiner

*Primary Examiner* — Joseph Saunders, Jr.
(74) *Attorney, Agent, or Firm* — Park, Kim & Suh, LLC

(57) ABSTRACT

Disclosed is an audio signal processing device for performing binaural rendering on an input audio signal. The audio signal processing device includes a reception unit configured to receive the input audio signal, a binaural renderer configured to generate a 2-channel audio by performing binaural rendering on the input audio signal, and an output unit configured to output the 2-channel audio. The binaural renderer performs binaural rendering on the input audio signal based on a distance from a listener to a sound source corresponding to the input audio signal and a size of an object simulated by the sound source.

20 Claims, 8 Drawing Sheets

APPARATUS AND METHOD FOR PROCESSING AUDIO SIGNAL TO PERFORM BINAURAL RENDERING

CROSS-REFERENCE TO RELATED APPLICATION

This application claims priority to Korean Patent Application No. 10-2016-0055791 filed on May 4, 2016 and all the benefits accruing therefrom under 35 U.S.C. § 119, the contents of which are incorporated by reference in their entirety.

BACKGROUND

The present invention relates to an audio signal processing method and device. More specifically, the present invention relates to an audio signal processing method and device for performing binaural rendering on an audio signal.

3D audio commonly refers to a series of signal processing, transmission, encoding, and playback techniques for providing a sound which gives a sense of presence in a three-dimensional space by providing an additional axis corresponding to a height direction to a sound scene on a horizontal plane (2D) provided by conventional surround audio. In particular, 3D audio requires a rendering technique for forming a sound image at a virtual position where a speaker does not exist even if a larger number of speakers or a smaller number of speakers than that for a conventional technique are used.

3D audio is expected to become an audio solution to an ultra high definition TV (UHDTV), and is expected to be applied to various fields of theater sound, personal 3D TV, tablet, wireless communication terminal, and cloud game in addition to sound in a vehicle evolving into a high-quality infotainment space.

Meanwhile, a sound source provided to the 3D audio may include a channel-based signal and an object-based signal. Furthermore, the sound source may be a mixture type of the channel-based signal and the object-based signal, and, through this configuration, a new type of listening experience may be provided to a user.

Binaural rendering is performed to model such a 3D audio into signals to be delivered to both ears of a human being. A user may experience a sense of three-dimensionality from a binaural-rendered 2-channel audio output signal through a headphone or an earphone. A specific principle of the binaural rendering is described as follows. A human being listens to a sound through two ears, and recognizes the location and the direction of a sound source from the sound. Therefore, if a 3D audio can be modeled into audio signals to be delivered to two ears of a human being, the three-dimensionality of the 3D audio can be reproduced through a 2-channel audio output without a large number of speakers.

An audio signal processing device may simulate a sound source as a single dot in a 3D audio. In the case where the audio signal processing device simulates a sound source as a single dot, the audio signal processing device equally simulates audio signals output from sound sources which simulate objects having different sizes. Here, when the distance between a listener and the sound sources is short, the audio signal processing device may be unable to reproduce a difference between the audio signals delivered according to the sizes of the objects which output the audio signals.

SUMMARY

The present disclosure provides an audio signal processing device and method for binaural rendering.

In accordance with an exemplary embodiment of the present invention, an audio signal processing device for performing binaural rendering on an input audio signal includes: a reception unit configured to receive the input audio signal; a binaural renderer configured to generate a 2-channel audio by performing binaural rendering on the input audio signal; and an output unit configured to output the 2-channel audio. The binaural renderer may perform binaural rendering on the input audio signal based on a distance from a listener to a sound source corresponding to the input audio signal and a size of an object simulated by the sound source.

The binaural renderer may determine a characteristic of a head related transfer function (HRTF) based on the distance from the listener to the sound source and the size of the object simulated by the sound source, and may perform binaural rendering on the input audio signal using the HRTF.

The HRTF may be a pseudo HRTF generated by adjusting an initial time delay of an HRTF corresponding to a path from the listener to the sound source based on the distance from the listener to the sound source and the size of the object simulated by the sound source.

When the size of the object simulated by the sound source becomes larger in comparison with the distance from the listener to the sound source, the initial time delay used to generate the pseudo HRTF may increase.

The binaural renderer may filters the input audio signal using the HRTF corresponding to the path from the listener to the sound source and the pseudo HRTF. Here, the binaural render may determine a ratio between an audio signal filtered with the pseudo HRTF and an audio signal filtered with the HRTF corresponding to the path from the listener to the sound source based on the size of the object simulated by the sound source in comparison with the distance from the listener to the sound source.

In detail, when the size of the object simulated by the sound source becomes larger in comparison with the distance from the listener to the sound source, the binaural renderer may increase the ratio of the audio signal filtered with the pseudo HRTF to the audio signal filtered with the HRTF corresponding to the path from the listener to the sound source based on the size of the object simulated by the sound source in comparison with the distance from the listener to the sound source.

The pseudo HRTF may be generated by adjusting at least one of a phase between 2 channels of the HRTF or a level difference between the 2 channels of the HRTF based on the distance from the listener to the sound source and the size of the object simulated by the sound source.

The binaural renderer may determine the number of the pseudo HRTFs based on the distance from the listener to the sound source and the size of the object simulated by the sound source, and may use the HRTF and a determined number of the pseudo HRTFs.

The binaural renderer may process only an audio signal of a frequency band having a shorter wavelength than a preset maximum time delay from among audio signals filtered with the pseudo HRTF.

The binaural renderer may perform binaural rendering on the input audio signal using a plurality of HRTFs respectively corresponding to paths from a plurality of points on the sound source to the listener.

Here, the binaural renderer may determine the number of the plurality of points on the sound source based on the distance from the listener to the sound source and the size of the object simulated by the sound source.

The binaural renderer may determine locations of the plurality of points on the sound source based on the distance from the listener to the sound source and the size of the object simulated by the sound source.

The binaural renderer may adjust an interaural cross correlation (IACC) between the 2-channel audio signals based on the distance from the listener to the sound source and the size of the object simulated by the sound source.

In detail, when the size of the object simulated by the sound source becomes larger in comparison with the distance from the listener to the sound source, the binaural renderer may decrease the IACC between the 2-channel audio signals.

The binaural renderer may adjust the IACC between the 2-channel audio signals by randomizing a phase of a head related transfer function (HRTF) corresponding to the 2-channel audio signals.

The binaural renderer may adjust the IACC between the 2-channel audio signals by adding a signal obtained by randomizing a phase of the input audio signal and a signal obtained by filtering the input audio signal with a head related transfer function (HRTF) corresponding to a path from the listener to the sound source.

The binaural renderer may calculate the size of the object simulated by the sound source based on a directivity pattern of the input audio signal.

The binaural renderer may differently calculate the size of the object simulated by the sound source for each frequency band of the input audio signal.

When performing binaural rendering on relatively low frequency band components in the input audio signal, the binaural renderer may calculate the size of the object simulated by the sound source as a larger value than the size of the object simulated by the sound source calculated when performing binaural rendering on relatively high frequency band components.

The binaural renderer may calculate the size of the object simulated by the sound source based on a head direction of the listener.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
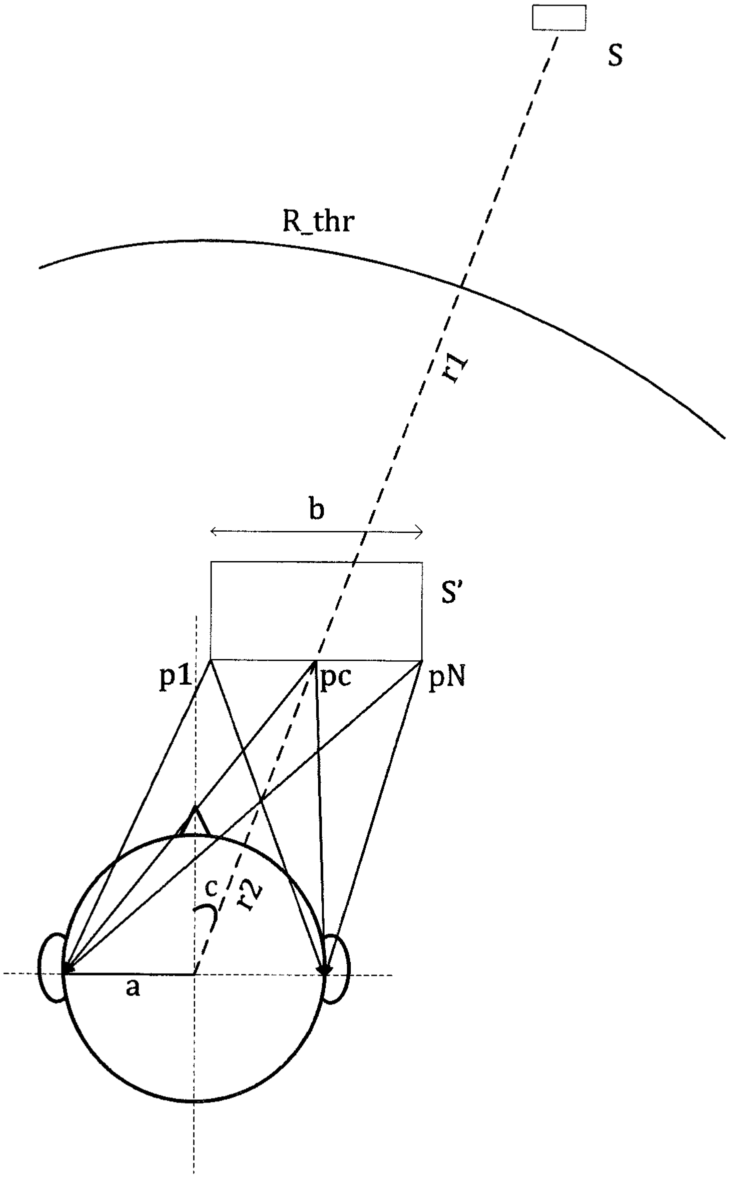
FIG. 1 illustrates that characteristics of an audio signal delivering at both ears of a listener change according to a size of an object simulated by a sound source and a distance from the listener to the object.

Hereinafter, embodiments of the present invention will be described in detail with reference to the accompanying drawings so that the embodiments of the present invention can be easily carried out by those skilled in the art. However, the present invention may be implemented in various different forms and is not limited to the embodiments described herein. Some parts of the embodiments, which are not related to the description, are not illustrated in the drawings in order to clearly describe the embodiments of the present invention. Like reference numerals refer to like elements throughout the description.

When it is mentioned that a certain part "includes" certain elements, the part may further include other elements, unless otherwise specified.

FIG. 1 illustrates that characteristics of an audio signal delivering at both ears of a listener change according to a size of an object simulated by a sound source and a distance from the listener to the sound source.

In FIG. 1, an output direction of a first sound source S and an output direction of a second sound source S' form the same angle 'c' with respect to a center of the listener. Here, both the first sound source S and the second sound source S' are three-dimensional virtual sound sources, and in the present disclosure, a sound source represents a three-dimensional virtual sound source unless otherwise specified. The first sound source S and the second sound source S' may represent an audio object corresponding to an object signal or a loud speaker corresponding to a channel signal. The first sound source S is spaced a first distance r1 apart from the listener. The second sound source S' is spaced a second distance r2 apart from the listener. Here, an area of the first sound source S is relatively small in comparison with the first distance r1. An incidence angle of an audio signal output from a left end point of the first sound source S with respect to two ears of the listener is different from an incidence angle of an audio signal output from a right end point of the first sound source S with respect to two ears of the listener. However, since the first sound source S is spaced the first distance r1 apart from the listener, a difference between the audio signal output from the left end point of the first sound source S and delivered to the listener and the audio signal output from the right end point of the first sound source S and delivered to the listener may be relatively small. This is because the difference between the audio signals delivered to the listener, which is caused by the difference between the incidence angles of the audio signals, may decrease while the audio signals are delivered along a relatively long path. Therefore, an audio signal processing device may treat the first sound source S as a dot. In detail, the audio signal processing device may process an audio signal for binaural rendering by using a head related transfer function (HRTF) corresponding to a path from a center of the first sound source S to the listener. The HRTF may be a set of an ipsilateral HRTF corresponding to a channel audio signal for an ipsilateral ear and a contralateral HRTF corresponding to a channel audio signal for a contralateral ear. Here, the path from the center of the first sound source S to the listener may be a path connecting the center of the first sound source S and the center of the listener. In another specific embodiment, the path from the center of the first sound source S to the listener may be a path connecting the center of the first sound source S and two ears of the listener. In detail, the audio signal processing device may process an audio signal for binaural rendering by using the ipsilateral HRTF corresponding to an angle of incidence from the center of the first sound source S to the ipsilateral ear and the contralateral HRTF corresponding to an angle of incidence from the center of the first sound source S to the contralateral ear.

Here, an area of the second sound source S' for outputting an audio signal is not small in comparison with the second distance r2. Therefore, an incidence angle of an audio signal output from a left end point p1 of the second sound source S' with respect to the listener is different from an incidence angle of an audio signal output from a right end point pN of the second sound source S', and due to this difference between the incidence angles, audio signals delivered to the listener may have a significant difference. The audio signal processing device may perform binaural rendering on an audio signal in consideration of this difference.

The audio signal processing device may treat a sound source not as a point but as a sound source having an area. In detail, the audio signal processing device may perform binaural rendering on an audio signal based on the size of an object simulated by a sound source. In a specific embodiment, the audio signal processing device may perform binaural rendering on an audio signal based on the distance between the listener and a sound source and the size of an object simulated by the sound source. For example, when the audio signal processing device performs binaural rendering on an audio signal of a sound source within a reference distance R_thr from the listener, the audio signal processing device may perform binaural rendering on the audio signal based on the size of an object simulated by the sound source. The size of an object simulated by a sound source may be the surface area of the object simulated by the sound source. In detail, the area of the object simulated by the sound source may represent an surface area for outputting an audio signal in the object simulated by the sound source. The size of the object simulated by the sound source may be a volume of the sound source. For convenience, the size of the object simulated by the sound source is referred to as a size of the sound source.

The audio signal processing device may perform binaural rendering on an audio signal by adjusting a characteristic of an HRTF based on the size of a sound source. The audio signal processing device may perform binaural rendering on an audio signal by using a plurality of HRTFs based on the size of a sound source. Here, the audio signal processing device may consider the distance from the listener to the sound source together with the size of the sounds source. In detail, the audio signal processing device may perform binaural rendering on an audio signal by using a plurality of HRTFs corresponding to paths from a plurality of points on the sound source to the listener based on the distance from the listener to the sound source and the size of the sound source. In a specific embodiment, the audio signal processing device may perform binaural rendering on an audio signal by using a plurality of HRTFs corresponding to paths from a plurality of points on the sound source to the listener based on the distance from the sound source to the listener and the size of the sound source. Here, the audio signal processing device may select the number of the plurality of points on the sound source based on the distance from the listener to the sound source and the size of the sound source. Furthermore, the audio signal processing device may select the number of the plurality of points based on an amount of calculation for performing binaural rendering on an audio signal. Moreover, the audio signal processing device may select locations of the plurality of points on the sound source based on the distance from the listener to the sound source and the size of the sound source. The paths from the plurality of points on the sound source to the listener may represent paths from the plurality of points to a center of a head of the listener. Furthermore, the paths from the plurality of points on the sound source to the listener may represent paths from the plurality of points to two ears of the listener. Here, the audio signal processing device may perform binaural rendering on an audio signal in consideration of a parallax caused by a distance difference between the plurality of points on the sound source and two ears of the listener. In detail, the audio signal processing device may perform binaural rendering on an audio signal by using HRTFs respectively corresponding to a plurality of paths connecting the plurality of points on the sound source and two ears of the listener. This operation will be described in detail with reference to FIG. 3.

In the example of FIG. 1, the audio signal processing device may perform binaural rendering on an audio signal output from the second sound source S' by using a plurality of HRTFs p1 to pN corresponding to paths from a plurality of points on an audio signal output area 'b' of the second sound source S' to two ears of the listener. Here, each of the plurality of HRTFs p1 to pN may be an HRTF corresponding to an incidence angle of a straight line connecting the listener and each of the plurality of points on the audio signal output area 'b' of the second sound source S'. The incidence angle may be an elevation or an azimuth.

In another specific embodiment, the audio signal processing device may adjust an interaural cross correlation (IACC) between binaural-rendered 2-channel audio signals based on the size of a sound source. This is because when the listener listens to 2-channel audio signals having a low IACC, the listener feels as if two audio signals are coming from places spaced far apart from each other. This is because the listener feels that a sound source is relatively widely spread compared to when the listener listens to 2-channel audio signals having a high IACC. In detail, the audio signal processing device may adjust the IACC between binaural-rendered 2-channel audio signals based on the distance from the sound source to the listener and the size of the sound source. In a specific embodiment, the audio signal processing device may adjust the IACC between binaural-rendered 2-channel audio signals based on the distance from the sound source to the listener and the size of the sound source. For example, the audio signal processing device may compare the distance from the sound source to the listener with the size of the sound source to decrease the IACC of binaural-rendered 2-channel audio signals when the size of the sound source is relatively large. The audio signal processing device may randomize phases of HRTFs respectively corresponding to binaural-rendered 2-channel audio signals, so as to decrease the IACC of the binaural-rendered 2-channel audio signals. In detail, the audio signal processing device may decrease the IACC of the binaural-rendered 2-channel audio signals by adding random elements to the phases of the HRTFs as the area of the sound source relatively increases in comparison with the distance from the sound source to the listener. Furthermore, the audio signal processing device may restore the phases of the HRTFs as the area of the sound source relatively decreases in comparison with the distance from the sound source to the listener to increase the IACC of the binaural-rendered 2-channel audio signals. When the audio signal processing device simulates the size of a sound source by adjusting the IACC, the audio signal processing device may simulate the size of the sound source with a smaller amount of calculation compared to when the audio signal processing device uses a plurality of HRTFs corresponding to a plurality of paths connecting a plurality of points on the sound source and the listener. Furthermore, the audio signal processing device may adjust the IACC of binaural-rendered 2-channel audio signals, using a plurality of HRTFs corresponding to a plurality of paths connecting a plurality of points and the listener. Through these embodiments, the audio signal processing device may represent the size of an object simulated by a sound source. Specific operation of the audio signal processing device will be described with reference to FIGS. 2 to 8.

Figure 2:
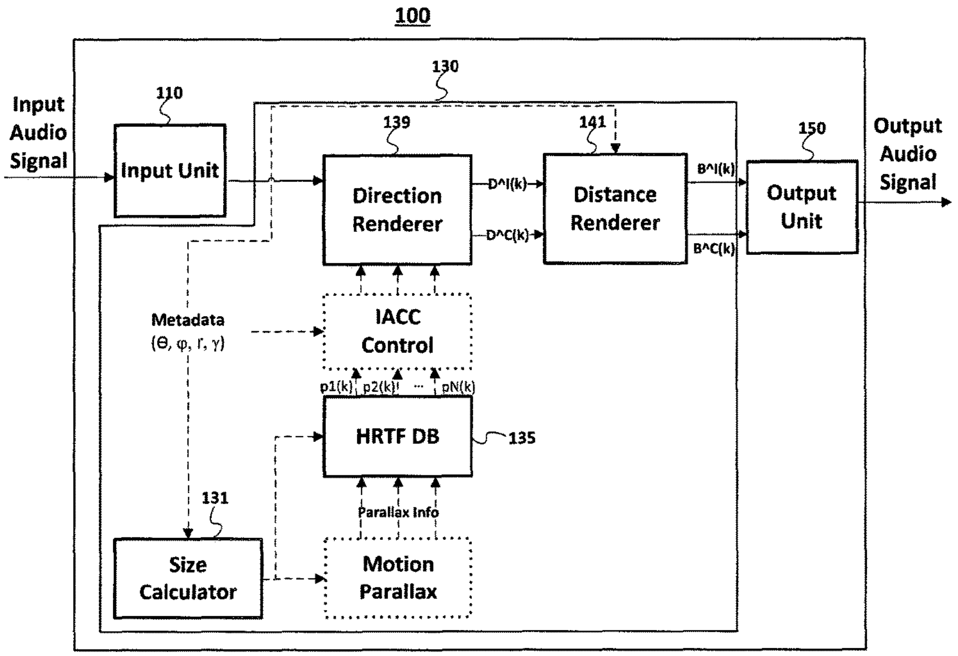
FIG. 2 is a block diagram illustrating a binaural audio signal processing device according to an embodiment of the present invention.

FIG. 2 is a block diagram illustrating a binaural audio signal processing device according to an embodiment of the present invention.

An audio signal processing device 100 includes an input unit 110, a binaural renderer 130, and an output unit 150. The input unit 110 receives an input audio signal. The binaural renderer 130 performs binaural rendering on an input audio signal. The output unit 150 outputs a binaural-rendered audio signal.

In detail, the binaural renderer 130 performs binaural rendering on the input audio signal to output a 2-channel audio signal in which the input audio signal is represented by a three-dimensional virtual sound source. To this end, the binaural renderer 130 may include a size calculation unit 131, and HRTF database 135, a direction renderer 139, and a distance renderer 141.

The size calculation unit 131 calculates the size of an object simulated by a sound source. The sound source may represent an audio object corresponding to an object signal or a loud speaker corresponding to a channel signal. In detail, the size calculation unit 131 may calculate a relative size of the sound source with respect to the distance from the sound source to the listener. Here, the size of the sound source may be the surface area of the sound source. In detail, the size of the sound source may represent an surface area outputting an audio signal. Furthermore, the size of the sound source may represent the volume of the sound source. When an audio signal matched to an image, the size calculation unit 131 may calculate the size of the sound source based on an image corresponding to the sound source. In detail, the size calculation unit 131 may calculate the size of the sound source based on the number of pixels of the image corresponding to the sound source. Furthermore, the size calculation unit 131 may receive metadata on the sound source to calculate the size of the sound source. Here, the metadata on the sound source may include localization information. In detail, the metadata may include information on at least one of the azimuth, elevation, distance, and volume of an object sound source.

The binaural renderer 130 selects an HRTF corresponding to the sound source from the HRTF database 135, and applies the selected HRTF to an audio signal corresponding to the sound source. Here, the HRTF may be a set of an ipsilateral HRTF corresponding to a channel audio signal for an ipsilateral ear and a contralateral HRTF corresponding to a channel audio signal for a contralateral ear. As described above, the binaural renderer 130 may select an HRTF corresponding to a path from the sound source to the listener. Here, the path from the sound source to the listener may represent a path from the sound source to a center of the listener. Furthermore, the path from the sound source to the listener may represent a path from the sound source to two ears of the listener. Here, the binaural renderer 130 may determine a characteristic of an HRTF based on the path from the sound source to the listener and the size of the sound source. In detail, the binaural renderer 130 may perform binaural rendering on an audio signal by using a plurality of HRTFs based on the path from the sound source to the listener and the size of the sound source. In a specific embodiment, the binaural renderer 130 may perform binaural rendering on an audio signal by using a plurality of HRTFs corresponding to paths from a plurality of points to the listener based on the distance from the sound source to the listener and the size of the sound source. Here, the binaural renderer 130 may select the number of the plurality of points based on the distance from the listener to the sound source and the size of the sound source. In detail, the binaural renderer 130 may select the number of the plurality of points based on the amount of calculation for performing binaural rendering on an audio signal. Furthermore, the binaural renderer 130 may select locations of the plurality of points based on the distance from the listener to the sound source and the size of the sound source. Moreover, the binaural renderer 130 may select an HRTF corresponding to the sound source from the HRTF database 135 based on the metadata described above. Here, the binaural renderer 130 may perform binaural rendering on an audio signal in consideration of the parallax caused by a distance difference between a point on the sound source, which is a reference for selecting an HRTF, and the two ears. In detail, the binaural renderer 130 may perform binaural rendering on an audio signal in consideration of the parallax caused by the distance difference between the point on the sound source, which is a reference for selecting an HRTF, and the two ears based on the above-mentioned metadata. In a specific embodiment, the binaural renderer 130 may apply a parallax effect to the input audio signal based on an altitude and a direction of the sound source. Application of the parallax effect and selection of an HRTF will be described in detail with reference to FIG. 3.

Furthermore, the binaural renderer 130 may adjust the IACC of binaural-rendered 2-channel audio signals as described above. In detail, the binaural renderer 130 may adjust the IACC between binaural-rendered 2-channel audio signals based on the distance from the sound source to the listener and the size of the sound source. In a specific embodiment, the binaural renderer 130 may adjust the IACC between binaural-rendered 2-channel audio signals based on the distance from the sound source to the listener and the size of the sound source. In a specific embodiment, the binaural renderer 130 may adjust the HRTF to adjust the IACC. In another specific embodiment, the binaural renderer 130 may adjust the IACC of direction-rendered audio signals. This operation will be described in detail with reference to FIG. 4.

The direction renderer 139 localizes a sound source direction of the input audio signal. The direction renderer 130 may apply, to the input audio signal, a binaural cue, i.e., a direction cue, for identifying the direction of the sound source with respect to the listener. Here, the direction cue may include at least one of an interaural level difference, an interaural phase difference, a spectral envelope, a spectral notch, or a peak. The direction renderer 130 may perform binaural rendering by using binaural parameters of an ipsilateral transfer function which is an HRTF corresponding to an ipsilateral ear and a contralateral transfer function which is an HRTF corresponding to a contralateral ear. D^I(k) represents a signal output from the contralateral transfer function after direction rendering, and D^C(k) represents a signal output from the ipsilateral transfer function after direction rendering. Furthermore, the direction renderer 139 may localize the sound source direction of the input audio signal based on the above-mentioned metadata.

The distance renderer 141 applies, to the input audio signal, an effect according to the distance from the sound source to the listener. The distance renderer 141 may apply, to the input audio signal, a distance cue for identifying the distance of the sound source with respect to the listener. The distance renderer 141 may apply, to the input audio signal, a sound intensity according to a distance change of the sound source and a change of a spectral shape. The distance renderer 141 may differently process the input audio signal according to whether the distance from the listener to the sound source is equal to or less than a preset threshold value. When the distance from the listener to the sound source exceeds the preset threshold value, the distance renderer 141 may apply, to the input audio signal, a sound intensity which is inversely proportional to the distance from the listener to the sound source based on the head of the listener. When the distance from the listener to the sound source is equal to or less than the preset threshold value, the distance renderer 141 may render the input audio signal based on the distance of the sound source measured based on each of two ears of the listener. The distance renderer 141 may apply, to the input audio signal, the effect according to the distance from the sound source to the listener based on the above-mentioned metadata. B^I(k) represents a signal output from the contralateral transfer function after distance rendering, and B^C(k) represents a signal output from the ipsilateral transfer function after distanced rendering.

Figure 3:
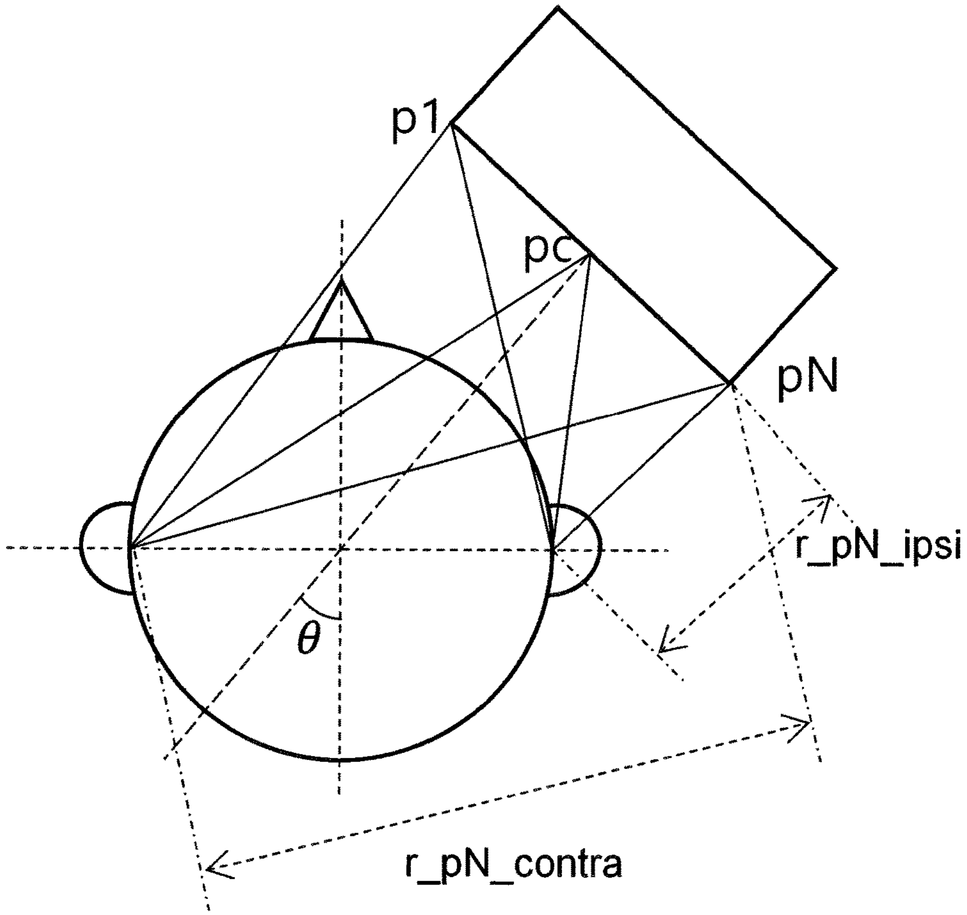
FIG. 3 illustrates a method for selecting an HRTF corresponding to a path from a sound source to a listener by an audio signal processing device according to an embodiment of the present invention.

FIG. 3 illustrates a method for selecting an HRTF corresponding to a path from a sound source to a listener by an audio signal processing device according to an embodiment of the present invention.

As described above, the audio signal processing device may determine a characteristic of an HRTF to be used for binaural rendering based on the distance from the sound source to the listener and the size of the sound source. In detail, the audio signal processing device may perform binaural rendering on an audio signal by using a plurality of HRTFs based on the distance from the sound source to the listener and the size of the sound source. Here, the binaural renderer may determine characteristics of the plurality of HRTFs based on the distance from the sound source to the listener and the size of the sound source. In a specific embodiment, the audio signal processing device may use a plurality of HRTFs corresponding to paths connecting a plurality of points of the sound source and the listener. Therefore, the audio signal processing device may perform binaural rendering on an audio signal by using the HRTFs corresponding to the paths from the plurality of points on the sound source to the listener based on the size of the sound source. An HRTF used by the audio signal processing device may be a set of an ipsilateral HRTF corresponding to a channel audio signal for an ipsilateral ear and a contralateral HRTF corresponding to a channel audio signal for a contralateral ear. In detail, the audio signal processing device may select HRTFs corresponding to the paths from the plurality of points on the sound source to the listener based on a width and a height of the sound source. In a specific embodiment, the audio signal processing device may select a plurality of HRTFs respectively corresponding to the paths from the plurality of points on the sound source to the listener based on the size of the sound source. For example, the audio signal processing device may select the plurality of points on the sound source based on the size of the sound source, and may calculate an incidence angle corresponding to an HRTF based on the distance between each of the plurality of points and the listener and a radius of the head of the listener. The audio signal processing device may select HRTFs corresponding to the plurality of points on the sound source based on the calculated incidence angle.

In a specific embodiment, the audio signal processing device may select the number of the plurality of points on the sound source based on the distance from the listener to the sound source and the size of the sound source. Moreover, the audio signal processing device may select the locations of the plurality of points on the sound source based on the distance from the listener to the sound source and the size of the sound source. For example, when the distance from the listener to the sound source exceeds the preset threshold value, the audio signal processing device may treat the sound source as a point source not having a size. Furthermore, when the distance from the listener to the sound source is smaller than the preset threshold value, the audio signal processing device may select a larger number of points on the sound source as the distance from the listener to the sound source decreases.

In another specific embodiment, the audio signal processing device may select three HRTFs respectively corresponding to three points corresponding to both ends of the sound source and a center of the sound source. Here, the audio signal processing device may select, as the HRTFs corresponding to both ends of the sound source, HRTFs corresponding to larger incidence angles as the distance from the listener to the sound source decreases. For example, the preset threshold value may be 1 m. When the distance from the listener to the sound source is 1 m, the incidence angle of the path connecting the sound source and the listener may be 45 degrees. When the distance from the listener to the sound source is 0.5 m, the audio signal processing device may select an HRTF corresponding to a distance of 0.5 m and an incidence angle of 35 degrees, an HRTF corresponding to a distance of 0.5 m and an incidence angle of 45 degrees, and an HRTF corresponding to a distance of 0.5 m and an incidence angle of 60 degrees. When the distance from the listener to the sound source is 0.2 m, the audio signal processing device may select an HRTF corresponding to a distance of 0.2 m and an incidence angle of 20 degrees, an HRTF corresponding to a distance of 0.2 m and an incidence angle of 45 degrees, and an HRTF corresponding to a distance of 0.2 m and an incidence angle of 70 degrees. The angles corresponding to both ends of the sound source may be set in advance according to the distance from the listener to the sound source. In another specific embodiment, the audio signal processing device may calculate, in real time, the angles corresponding to both ends of the sound source according to the distance from the listener to the sound source and the size of the sound source. Furthermore, the audio signal processing device may perform binaural rendering on an audio signal by using HRTFs respectively corresponding to a plurality of paths connecting the plurality of points on the sound source and two ears of the listener. Furthermore, the audio signal processing device may not compare the distance from the listener to the sound source with the threshold value. Here, the audio signal processing device may use the same number of HRTFs regardless of the distance from the listener to the sound source. Furthermore, the incidence angle of the path connecting the listener and the sound source may include an azimuth and an elevation. In detail, the audio signal processing device may perform binaural rendering on an audio signal according to the following equation.

$$D\_I(k) = X(k)p1\_I(k) + X(k)p2\_I(k) + \ldots + X(k)pN\_I(k) = X(k)\{p1\_I(k) + p2\_I + \ldots + pN\_I(k)\}$$
$$D\_C(k) = X(k)\{p1\_C(k) + p2\_C + \ldots + pN\_C(k)\} \quad \text{[Equation 1]}$$

'k' represents an index of a frequency. D_I(k) and D_C(k) respectively represent a channel signal corresponding to an ipsilateral ear and a channel signal corresponding to a contralateral ear processed based on the size of the sound source and the distance from the listener to the sound source when the frequency index is k. X(k) represents an input audio signal corresponding to the sound source when the frequency index is k. pn_I(k) and pn_C(k) respectively represent an ipsilateral HRTF and a contralateral HRTF corresponding to a path connecting a pn point of the sound source and the listener when the frequency index is k.

In Equation 1, the audio signal processing device down mixes a plurality of selected HRTFs, and then filters the input audio signal with the down-mixed HRTFs. Here, a result value of Equation 1 is the same as a value obtained by filtering, by the audio signal processing device, the input audio signal with each of the plurality of HRTFs. Therefore, the audio signal processing device may down mix the plurality of selected HRTFs, and then may filter the input audio signal with the down-mixed HRTFs. Through this operation, the audio signal processing device may reduce the amount of processing for binaural rendering.

Furthermore, the audio signal processing device may perform binaural rendering on an audio signal by adjusting a weight of a contralateral HRTF and a weight of an ipsilateral HRTF based on a path length difference between each point of the sound source and two ears of the listener. In detail, when a difference between a length of a path from each point of the sound source to the ipsilateral ear of the listener and a length of a path from each point of the sound source to the contralateral ear of the listener is at least a preset threshold value, the audio signal processing device may perform binaural rendering on an audio signal excepting components of the audio signal corresponding to the longer path. In the embodiment of FIG. 3, the audio signal processing device performs binaural rendering on an audio signal by using a plurality of HRTFs corresponding to paths connecting the plurality of points p1 to pN on the sound source and two ears of the listener. Here, a distance r_pm_contra from pm to the contralateral ear is larger than a distance r_pm_ipsi from pm to the ipsilateral ear. In detail, a difference between the distance r_pm_contra from pm to the contralateral ear and the distance r_pm_ipsi from pm to the ipsilateral ear is larger than a preset threshold value Rd_thr. The audio signal processing device may perform binaural rendering on an audio signal excepting an HRTF component corresponding to the path from pm to the contralateral ear. Through these embodiments, the audio signal processing device may reflect an effect of shadowing which may occur physically and psychoacoustically as the distance between the sound source and the listener decreases.

Furthermore, when the audio signal processing device performs binaural rendering on an input audio signal by using a plurality of HRTFs corresponding to paths from a plurality of points on the sound source to the listener, the audio signal processing device may synthesize a plurality of HRTFs having frequency responses with different peaks and notches according to an incidence angle (azimuth or elevation). Therefore, the direction cue of a binaural-rendered audio signal may be blurred, or a tone of the binaural-rendered audio signal may differ from that of the input audio signal. The audio signal processing device may perform binaural rendering on the input audio signal by assigning weights to the plurality of HRTFs corresponding to the paths from the plurality of points on the sound source to the listener. In detail, the audio signal processing device may perform binaural rendering on the input audio signal by assigning, based on the center of the sound source, window-type weights to the plurality of HRTFs corresponding to the paths from the plurality of points on the sound source to the listener. For example, the audio signal processing device may assign a largest weight to an HRTF corresponding to a path from a point corresponding to the center of the sound source to the listener. Furthermore, the audio signal processing device may assign a smaller weight to an HRTF corresponding to a path from a point spaced farther apart from the center of the sound source to the listener. In detail, the audio signal processing device may perform binaural rendering on an audio signal according to the following equation.

$$D\_I(k)=X(k)\{w(1)p1\_I(k)+ \ldots +w(c)pc\_I(k)+ \ldots +w(N)pN\_I(k)\}$$

$$D\_C(k)=X(k)\{w(1)p1\_C(k)+ \ldots +w(c)pc\_C(k)+ \ldots +w(N)pN\_C(k)\} \quad \text{[Equation 2]}$$

'k' represents an index of a frequency. D_I(k) and D_C(k) respectively represent a channel signal corresponding to an ipsilateral ear and a channel signal corresponding to a contralateral ear processed based on the size of the sound source the distance from the listener to the sound source when the frequency index is k. X(k) represents an input audio signal corresponding to the sound source when the frequency index is k. pn_I(k) and pn_C(k) respectively represent an ipsilateral HRTF and a contralateral HRTF corresponding to a path connecting a pn point of the sound source and the listener when the frequency index is k. w(x) represents a weight applied to an HRTF corresponding to a path from a point on the sound source to the listener. Here, w(c) is a weight applied to an HRTF corresponding to a path from the center of the sound source to the listener, and is largest among all weights. In a specific embodiment, w(x) may satisfy the following equation.

$$\mathrm{sum}(w\hat{\ }2(k))=1 \quad \text{[Equation 3]}$$

The audio signal processing device may constantly maintain an energy of a binaural-rendered audio signal using Equation 3. Through these embodiments, the audio signal processing device may maintain a sound source directivity, and may prevent a tone distortion which may occur during binaural rendering.

Figure 4:
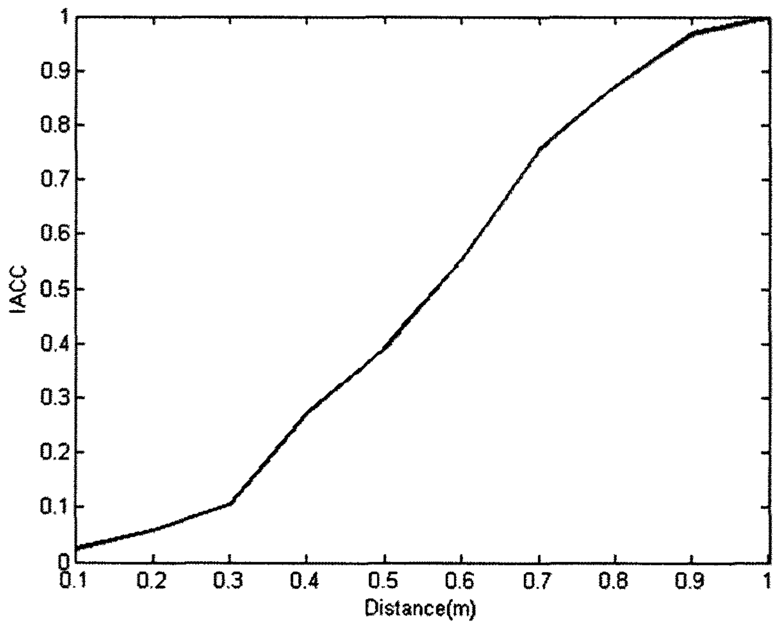
FIG. 4 illustrates an IACC between binaural-rendered 2-channel audio signals according to the distance from the listener to the sound source when the audio signal processing device according to an embodiment of the present invention adjusts the IACC between the binaural-rendered 2-channel audio signals according to the distance from the listener to the sound source.

FIG. 4 illustrates the IACC between binaural-rendered 2-channel audio signals according to the distance from the listener to the sound source when the audio signal processing device according to an embodiment of the present invention adjusts the IACC between the binaural-rendered 2-channel audio signals according to the distance from the listener to the sound source.

As described above, the audio signal processing device may adjust the IACC between binaural-rendered 2-channel audio signals based on the size of the sound source. In detail, the audio signal processing device may adjust the IACC between the binaural-rendered 2-channel audio signals based on the distance from the sound source to the listener and the size of the sound source. In a specific embodiment, the audio signal processing device may adjust the IACC of the binaural-rendered 2-channel audio signals based on the distance from the sound source to the listener and the size of the sound source. For example, the audio signal processing device may decrease the IACC of the binaural-rendered 2-channel audio signals when the size of the sound source becomes relatively larger since the distance from the sound source to the listener decreases. Furthermore, the audio signal processing device may increase the IACC of the binaural-rendered 2-channel audio signals when the size of the sound source becomes relatively smaller since the distance from the sound source to the listener increases. Here, the IACC of the binaural-rendered 2-channel audio signals and the relative distance from the listener to the sound source may have a relationship as illustrated in the graph of FIG. 4.

Here, the audio signal processing device may adjust the IACC by randomizing phases of the binaural-rendered 2-channel audio signals. In detail, the audio signal processing device may randomize phases of HRTFs respectively corresponding to binaural-rendered 2-channel audio signals, so as to decrease the IACC of the binaural-rendered 2-channel audio signals. In a specific embodiment, the audio signal processing device may obtain an HRTF for adjusting the IACC between the binaural-rendered 2-channel audio signals by using the following equation.

$$thr=\max(\min(r\hat{}a,\ thr\_max),\ thr\_min)$$

$$<pH\_i\_hat(k)=(1-thr)*<pH\_i(k)+thr*<pRand(k)$$

$$pH\_i\_hat(k)=|pH\_i(k)|\exp(j*<pH\_i\_hat(k)) \quad \text{[Equation 4]}$$

'thr' represents a randomization parameter. Here, 'a' is a parameter representing a degree of randomization of a phase according to the distance from the listener to the sound source, and r^a represents a randomization parameter value adjusted according to the distance from the listener to the sound source. thr_max represents a maximum randomization parameter, and thr_min represents a minimum randomization parameter. min(a, b) represents a minimum value among 'a' and 'b', and max(a, b) represents a maximum value among 'a' and 'b'. Therefore, the randomization parameter has a value which is equal to or less than the maximum randomization parameter value and is equal to or larger than the minimum randomization parameter value. 'k' represents an index of a frequency. pRand(k) represents a random number between −π~π applied to a corresponding frequency index. pH _i represents an HRTF corresponding to each binaural-rendered 2-channel audio signal. <pH_i(k) represents a phase of each HRTF corresponding to the frequency index k, and |pH_i(k) represents a magnitude of each HRTF corresponding to the frequency index k. <pH_i_hat(k) represents a phase of a randomized HRTF corresponding to the frequency index k, and pH_i_hat represents a randomized HRTF corresponding to the frequency index k.

In detail, the audio signal processing device may set 'thr' to a value close to 0 when the size of the sound source becomes relatively smaller since the distance from the listener to the sound source increases. In a specific embodiment, the audio signal processing device may set 'thr' to 0 when the distance from the listener to the sound source is larger than a preset threshold value. Here, the audio signal processing device may intactly use pH_i(k) of which a phase has not been adjusted. Furthermore, the audio signal processing device may set 'thr' to a value close to 1 when the size of the sound source becomes relatively larger since the distance from the listener to the sound source decreases. Here, the audio signal processing device may apply, to binaural rendering, an HRTF having a randomly obtained value as a phase.

Through the above-mentioned embodiments, the audio signal processing device may obtain a phase-randomized HRTF for each frequency index. Here, the audio signal processing device may obtain a direction-rendered audio signal based on an obtained HRTF as expressed by the following equation.

$$D\_I(k)=X(k)\{|pH1\_I\_hat(k)|\exp(-j*<pH1\_I\_hat(k))+\ \ldots\ +|pHN\_I\_hat(k)|\exp(-j*<pHN\_I\_hat(k))\}$$

$$D\_C(k)=X(k)\{|pH1\_C\_hat(k)|\exp(-j*<pH1\_C\_hat(k))+\ \ldots\ +|pHN\_C\_hat(k)|\exp(-j*<pHN\_C\_hat(k))\} \quad \text{[Equation 5]}$$

'k' represents an index of a frequency. D_I(k) and D_C(k) respectively represent a channel signal corresponding to an ipsilateral ear and a channel signal corresponding to a contralateral ear processed based on the size of the sound source and the distance from the listener to the sound source. X(k) represents an input audio signal corresponding to the sound source.

In the above-mentioned embodiments, the audio signal processing device may adjust the IACC between binaural-rendered 2-channel audio signals for each frequency band. In detail, the audio signal processing device may adjust the IACC between binaural-rendered two channels for each frequency band based on the size of the sound source. In a specific embodiment, the audio signal processing device may adjust the IACC between binaural-rendered two channels for each frequency band based on the size of the sound source and the distance from the listener to the sound source. In detail, the audio signal processing device may adjust the IACC between the binaural-rendered 2-channel audio signals at a frequency band in which an influence on a sound tone is small according to a characteristic of an input audio signal corresponding to the sound source. For example, when it is less necessary to significantly increase the size of the sound source since the size of an object simulated by the sound source, such as a bee sound or a mosquito sound, is small, the audio signal processing device may randomize high-frequency band components of an audio signal corresponding to the object. Furthermore, when the size of an object simulated by the sound source is large or it is necessary to increase the size of the sound source, the audio signal processing device may randomize low-frequency band components of an audio signal corresponding to the sound source. Furthermore, the audio signal processing device may adjust the IACC of k components of a frequency band corresponding to w/c>>r among binaural-rendered 2-channel audio signals. Here, 'w' represents an angular frequency, 'c' represents a sonic speed, and 'r' represents the distance from the listener to the sound source. Through these embodiments, the audio signal processing device may minimize a tone change which may occur due to IACC adjustment.

In another specific embodiment, the size of the sound source may be adjusted by adding a signal obtained by filtering an input audio signal with an HRTF corresponding to a path from the listener to the sound source to a signal obtained by randomizing the input audio signal itself. For convenience, a signal obtained by filtering an audio signal with an HRTF corresponding to a path from the listener to the sound source is referred to as a filtered audio signal, and an audio signal obtained by randomizing the phase of the audio signal is referred to as a random-phase audio signal. Here, the audio signal processing device may adjust a ratio between the random-phase audio signal and the filtered audio signal based on the distance from the listener to the sound source and the size of the sound source. In a specific embodiment, when the size of the sound source becomes relatively larger since the distance from the listener to the sound source decreases, the audio signal processing device may decrease the ratio of the filtered audio signal to the random-phase audio signal. When the size of the sound source becomes relatively smaller since the distance from the listener to the sound source increases, the audio signal processing device may increase the ratio of the filtered audio signal to the random-phase audio signal. Through these embodiments, the audio signal processing device may adjust the IACC between binaural-rendered 2-channel audio signals while reducing the amount of calculation. In detail, the audio signal processing device may perform binaural rendering on the audio signal corresponding to the sound source using to the following equation.

$$D\_I(k)=X(k)p1\_I(k)+X(k)v(k)\exp(j*p\mathrm{Rand}1(k))$$

$$D\_C(k)=X(k)p1\_C(k)+X(k)v(k)\exp(j*p\mathrm{Rand}2(k)) \quad \text{[Equation 6]}$$

D_I(k) and D_C(k) respectively represent a channel signal corresponding to an ipsilateral ear and a channel signal corresponding to a contralateral ear processed based on the size of the sound source and the distance from the listener to the sound source. X(k) represents an input audio signal. pn_I(k) and pn_C(k) respectively represent an ipsilateral HRTF and a contralateral HRTF corresponding to a path connecting a pn point of the sound source and the listener. pRandn1(k) and pRandn2(k) are uncorrelated randomization variables. v(k) represents a ratio of a signal obtained by filtering the input audio signal with an HRTF corresponding to the sound source to a phase-randomized input audio signal. Here, v(k) may have a time-varying value based on the distance from the listener to the sound source and the size of the sound source. The audio signal processing device may obtain v(k) using the following equation.

$$v(k)=(1+r\_\mathrm{hat})/(1-r\_\mathrm{hat})$$

$$r\_\mathrm{hat}=\max(\min(r\hat{}a,\ thr\_\mathrm{max}),\ thr\_\mathrm{min}) \quad \text{[Equation 7]}$$

'a' is a parameter representing a degree of random adjustment of a phase according to the distance from the listener to the sound source and the size of the sound source, and r_hat represents a random adjustment parameter value adjusted based on the distance from the listener to the sound source and the size of the sound source. thr_max represents a maximum random adjustment parameter, and thr_min represents a minimum random adjustment parameter. min(a, b) represents a minimum value among 'a' and and max(a, b) represents a maximum value among 'a' and Therefore, the random adjustment parameter has a value which is equal to or less than the maximum random adjustment parameter value and is equal to or larger than the minimum random adjustment parameter value.

As described above, the audio signal processing device may perform binaural rendering on an audio signal by using a plurality of HRTFs based on the distance from the sound source to the listener and the size of the sound source. Here, the binaural renderer may determine a characteristic of an HRTF based on the distance from the sound source to the listener and the size of the sound source. Described above with reference to FIG. 3 is a method for reproducing, by the audio signal processing device, three-dimensionality of an object simulated by the sound source by using a plurality of HRTFs corresponding to paths from a plurality of points on the sound source to the listener. Here, the plurality of HRTF may be pre-measured HRTFs. Described above with reference to FIG. 4 is a method for reproducing, by the audio signal processing device, three-dimensionality of an object simulated by the sound source by adjusting the phase of an HRTF. In another embodiment of the present invention, the audio signal processing device may generate a pseudo HRTF by adjusting at least one of an initial time delay, an inter-channel phase, or an inter-channel level in an HRTF corresponding to a path connecting one point of the sound source and the listener. Here, the audio signal processing device may perform binaural rendering on an audio signal by using the pseudo HRTF. In a specific embodiment, the audio signal processing device may use a plurality of pseudo HRTFs. Furthermore, the audio signal processing device may perform binaural rendering on an audio signal by using both a pseudo HRTF and an HRTF corresponding to a path connecting one point of the sound source and the listener. This operation will be described in detail with reference to FIG. 5.

Figure 5:
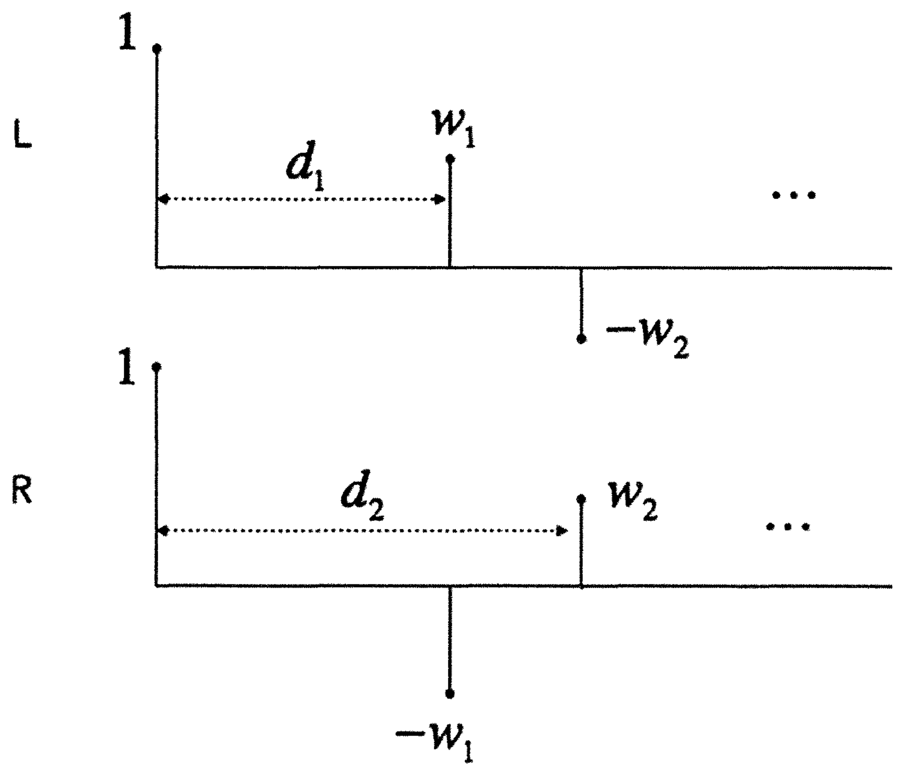
FIG. 5 illustrates an impulse response of a pseudo HRTF used by the audio signal processing device according to an embodiment of the present invention to perform binaural rendering on an audio signal.

FIG. 5 illustrates an impulse response of a pseudo HRTF used by the audio signal processing device according to an embodiment of the present invention to perform binaural rendering on an audio signal.

The audio signal processing device may perform binaural rendering on an input audio signal corresponding to the sound source by using an HRTF corresponding to a path connecting one point of the sound source and the listener and a pseudo HRTF generated based on the HRTF. In detail, the audio signal processing device may add an audio signal filtered with an HRTF corresponding to a path connecting one point of the sound source and the listener and an audio signal filtered with a pseudo HRTF generated based on the HRTF to perform binaural rendering on an audio signal.

The audio signal processing device may adjust at least one of an initial time delay, an inter-channel phase, or an inter-channel level in an HRTF corresponding to a path connecting one point of the sound source and the listener to generate a pseudo HRTF. In detail, the audio signal processing device may adjust the initial time delay, the inter-channel phase, and the inter-channel level in the HRTF corresponding to the path connecting one point of the sound source and the listener to generate the pseudo HRTF. Furthermore, the audio signal processing device may adjust the initial time delay of the pseudo HRTF based on the distance from the listener to the sound source and the size of the sound source. In detail, when the size of the sound source becomes relatively smaller since the distance from the listener to the sound source increases, the audio signal processing device may reduce the initial time delay of the pseudo HRTF based on the distance from the listener to the sound source and the size of the sound source. For example, the audio signal processing device may set the initial time delay of the pseudo HRTF to 0 when the distance from the listener to the sound source is larger than a preset threshold value. Furthermore, when the size of the sound source becomes relatively larger since the distance from the listener to the sound source decreases, the audio signal processing device may increase the initial time delay of the pseudo HRTF based on the distance from the listener to the sound source and the size of the sound source. For example, when the distance from the listener to the sound source is smaller than the preset threshold value, the audio signal processing device may increase the initial time delay of the pseudo HRTF based on the distance from the listener to the sound source and the size of the sound source.

When using both an HRTF corresponding to a path connecting one point of the sound source and the listener and a pseudo HRTF generated based on the HRTF, the audio signal processing device may adjust a ratio between an audio signal filtered with the HRTF corresponding to the path connecting the sound source and the listener and an audio signal filtered with the pseudo HRTF based on the distance to the sound source and the size of the sound source. In detail, when the size of the sound source becomes relatively smaller since the distance from the listener to the sound source increases, the audio signal processing device may reduce the ratio of the audio signal filtered with the pseudo HRTF to the audio signal filtered with the HRTF corresponding to the path connecting the sound source and the listener based on the distance from the listener to the sound source and the size of the sound source. For example, when the distance from the listener to the sound source is larger than a preset threshold value, the audio signal processing device may set, to 0, the ratio of the audio signal filtered with the pseudo HRTF to the audio signal filtered with the HRTF corresponding to the path connecting the sound source and the listener. Furthermore, when the size of the sound source becomes relatively larger since the distance from the listener to the sound source decreases, the audio signal processing device may increase the ratio of the audio signal filtered with the pseudo HRTF to the audio signal filtered with the HRTF corresponding to the path connecting the sound source and the listener based on the distance from the listener to the sound source and the size of the sound source. For example, when the distance from the listener to the sound source is smaller than the preset threshold value, the audio signal processing device may increase the ratio of the audio signal filtered with the pseudo HRTF to the audio signal filtered with the HRTF corresponding to the path connecting one point of the sound source and the listener based on the distance from the listener to the sound source and the size of the sound source.

Furthermore, the audio signal processing device may generate a plurality of pseudo HRTFs, and may perform binaural rendering on an audio signal by using the plurality of pseudo HRTFs. Here, the audio signal processing device may select the number of pseudo HRTFs to be generated based on the distance to the sound source and the size of the sound source. Furthermore, the audio signal processing device may select a location of a point of the sound source which is to serve as a reference of a path connecting the listener and the sound source based on the distance from the listener to the sound source and the size of the sound source. In a specific embodiment, the audio signal processing device may perform binaural rendering on an audio signal using the following equation.

$$H\_n\_\mathrm{hat}\_I(k)=w\_n*H\_I\_n(k)\exp(j*2\pi*d\_n/N)$$

$$H\_n\_\mathrm{hat}\_C(k)=-w\_n*H\_C\_n(k)\exp(j*2\pi*d\_n/N) \quad \text{[Equation 8]}$$

'k' represents an index of a frequency. N represents the size of a single frame in a frequency domain. H_IC_n(k) represents an HRTF corresponding to a path connecting the sound source and the listener. In detail, H_IC_n(k) may represent an HRTF corresponding to a path connecting a sound source center and the listener. Furthermore, the audio signal processing device may select an HRTF using the above-mentioned size calculation unit. Furthermore, the audio signal processing device may generate single H_n_hat_IC(k) or a plurality of H_n_hat_IC(k). H_n_hat_IC(k) represents a pseudo HRTF generated by adjusting an initial time delay in H_IC_n(k). d_n represents a time delay applied to a pseudo HRTF. The audio signal processing device may determine a value of d_n based on the distance from the listener to the sound source and the size of the sound source as described above. w_n represents a ratio of an audio signal filtered with a pseudo HRTF to an audio signal filtered with an HRTF corresponding to a path connecting one point of the sound source and the listener. The audio signal processing device may determine a value of w_n based on the distance from the listener to the sound source and the size of the sound source as described above.

FIG. 5 illustrates impulse responses of an HRTF corresponding to a path connecting one point of the sound source and the listener and a pseudo HRTF. The impulse response with a magnitude of 1 represents the impulse response of an HRTF corresponding to a path connecting the sound source and the listener. Furthermore, FIG. 5 illustrates the impulse response of a pseudo HRTF in which a first weight w1 is applied at a location delayed by a first time d1 and the impulse response of a pseudo HRTF in which a second weight w2 is applied at a location delayed by a second time d2.

In these embodiments, the listener first listens to an audio signal filtered not with a pseudo HRTF but with an HRTF. Due to a precedence effect, although the listener listens to an audio signal filter with a pseudo HRTF, the listener may not confuse an original direction of the sound source. Furthermore, 2-channel audio signals filtered with a pseudo HRTF have the same phase difference at all frequencies. Therefore, a tone distortion, which may occur due to binaural rendering performed based on the distance from the sound source to the listener and the size of the sound source, may be small.

Furthermore, the audio signal processing device may normalize a weight of an audio signal filtered with a pseudo HRTF with respect to an audio signal filtered with an HRTF corresponding to a path connecting the sound source and the listener to perform binaural rendering on an audio signal. In this manner, the audio signal processing device may constantly maintain a level of an audio signal corresponding to the sound source. In detail, the audio signal processing device may perform binaural rendering on an audio signal as represented by the following equation.

$$D\_I(k)=X(k)\{H\_I(k)+H1\_\mathrm{hat}\_I(k)+H2\_\mathrm{hat}\_I(k)+ \ldots +Hn\_\mathrm{hat}\_I(k)\}/\mathrm{sqrt}(1+w\_1\hat{}2+ \ldots +w\_n\hat{}2)$$

$$D\_C(k)=X(k)\{H\_C(k)+H1\_\mathrm{hat}\_C(k)+H2\_\mathrm{hat}\_C(k)+ \ldots +Hn\_\mathrm{hat}\_C(k)\}/\mathrm{sqrt}(1+w\_1\hat{}2+ \ldots +w\_n\hat{}2) \quad \text{[Equation 9]}$$

'k' represents an index of a frequency. H_IC_n(k) represents an HRTF corresponding to a path connecting the sound source and the listener. H_n_hat_IC(k) represents a pseudo HRTF generated by adjusting an initial time delay in H_IC_n(k). w_n represents a ratio of an audio signal filtered with a pseudo HRTF to an audio signal filtered with an HRTF corresponding to a path connecting the sound source and the listener. Furthermore, in order to render a sound source having an extended width, the audio signal processing device may perform binaural rendering on an audio signal by using a combination of H_n_hat_IC(k) without using H_IC_n(k). Here, the audio signal processing device may not use H_I(k) and H_C(k) in Equation 9, and the constant term 1 may be omitted when calculating a normalized value used for energy conservation.

The audio signal processing device may process only an audio signal of a frequency band having a shorter wavelength than a preset maximum time delay from among audio signals filtered with a pseudo HRTF. In detail, the audio signal processing device may not process an audio signal of a frequency band having a longer wavelength than the preset maximum time delay. In a specific embodiment, the audio signal processing device may not process a frequency band corresponding to k_c>k in the following equation.

$$k\_c=1/(d\_n/fs) \quad \text{[Equation 10]}$$

Through these embodiments, a sound quality distortion which may occur at a low-frequency band may be prevented. In detail, left and right sides of 2-channel audio signals filtered with an HRTF may have a certain phase difference, and may have opposite signs. Here, an audio signal filtered with an HRTF corresponding to a path connecting one point of the sound source and the listener and an audio signal filtered with a pseudo HRTF are decorrelated signals. Therefore, a signal of a low-frequency band may be delivered as a signal corresponding to an opposite ear, and a sound quality distortion may occur. Through the above-mentioned embodiments, the audio signal processing device may prevent such a sound quality distortion.

Figure 6:
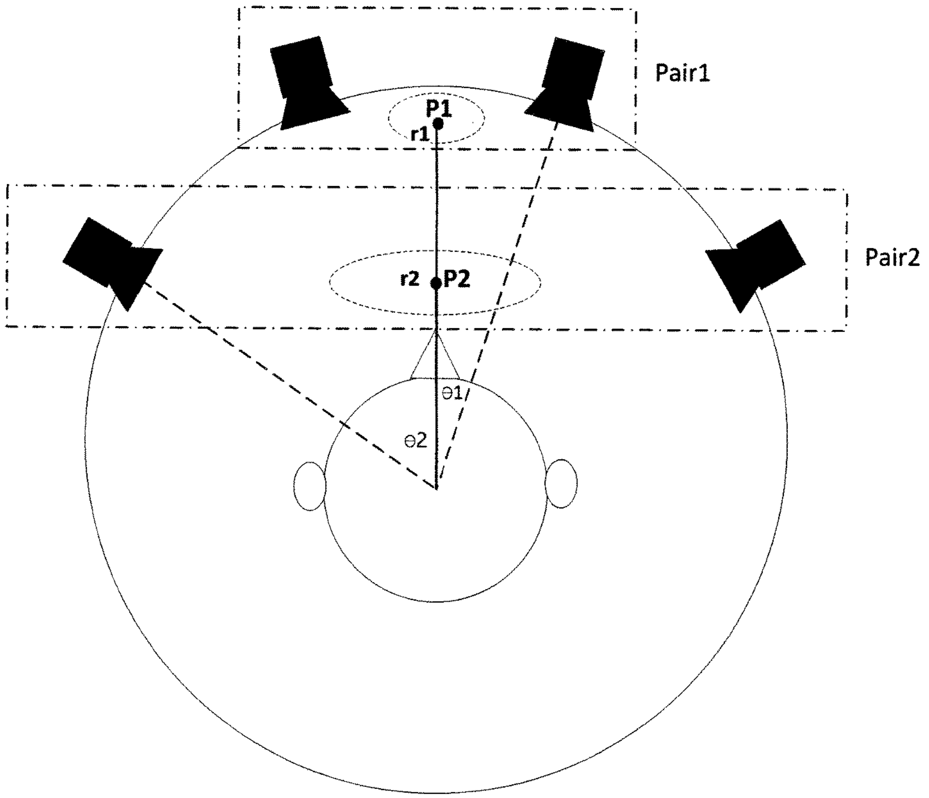
FIG. 6 illustrates that the audio signal processing device according to an embodiment of the present invention performs binaural rendering on an audio signal by setting a plurality of sound sources substituting one sound source.

FIG. 6 illustrates that the audio signal processing device according to an embodiment of the present invention performs binaural rendering on an audio signal by setting a plurality of sound sources substituting one sound source.

The audio signal processing device may perform binaural rendering on an audio signal by substituting one sound source with a plurality of sound sources. Here, audio signals corresponding to the plurality of sound sources are localized at a location of the one sound source substituted with the plurality of sound sources. In a stereo speaker environment, panning may be used to simulate a sound source such as a dot. When a stereo speaker is panned to a single center point, a sound image is distributed. Here, the listener may feel a sense of three-dimensionality of an object simulated by a sound source. Therefore, even when the audio signal processing device substitutes one sound source with a plurality of sound sources, the listener may feel a sense of three-dimensionality of an object simulated by a sound source.

In detail, the audio signal processing device may use a plurality of HRTFs, and the plurality of HRTFs may respectively correspond to a plurality of paths connecting the listener and the plurality of sounds sources substituting one sound source. The number of the plurality of sound sources may be two. Furthermore, the plurality of sound sources output an audio signal localized at the location of the corresponding sound source.

The audio signal processing device may adjust a distance between the plurality of sound sources substituting one sound source based on the distance from the listener to the sound source and the size of the sound source. In detail, when the relative size of the sound source becomes larger since the distance from the listener to the sound source decreases, the audio signal processing device may increase the distance between the plurality of sound sources based on the distance from the listener to the sound source and the size of the sound source. For example, when the relative size of the sound source is large since the distance from the listener to the sound source is equal to or less than a preset threshold value, the audio signal processing device may increase the distance between the plurality of sound sources based on the distance from the listener to the sound source and the size of the sound source. Furthermore, when the relative size of the sound source becomes smaller since the distance from the listener to the sound source increases, the audio signal processing device may decrease the distance between the plurality of sound sources based on the distance from the listener to the sound source and the size of the sound source. Furthermore, when the relative size of the sound source is small since the distance from the listener to the sound source is equal to or larger than the preset threshold value, the audio signal processing device may not substitute the corresponding sound source with the plurality of sound sources.

Operation of the audio signal processing device will be described in detail with reference to FIG. 6. When the sound source is spaced a first distance r1 apart from the listener, the audio signal processing device substitutes one point P1 on the sound source with a first sound source set Pair1 of two sound sources outputting audio signals localized at the location of P1. Furthermore, when the sound source is spaced a second distance r2 apart from the listener, the audio signal processing device substitutes one point P2 on the sound source with a second sound source set Pair2 of two sound sources outputting audio signals localized at the location of P2. Here, since the second distance r2 is smaller than the first distance r1, the audio signal processing device adjusts the distance between the sound sources included in the second sound source set Pair2 longer than the distance between the sound sources included in the first sound source set Pair1.

With reference to the above-mentioned embodiments, a method for representing, by the audio signal processing device, three-dimensionality of an object simulated by a sound source has been described. To represent the three-dimensionality of an object simulated by a sound source, it is necessary to consider not only the distance to the sound source and the size of the sound source but also other factors. Relevant descriptions are provided below.

The audio signal processing device may calculate the size of the sound source based on the head direction of the listener and the direction of the sound source, and may perform binaural rendering on an audio signal based on the calculated size of the sound source. In detail, when applying a parallax, the audio signal processing device may apply not only a horizontal parallax but also a vertical parallax. This is because an elevation difference of the two ears of the listener may be changed due to a relative position of the listener and the sound source and rotation of the head of the listener. For example, when the two ears of the listener are located on a diagonal line with respect to the sound source, the audio signal processing device may apply a vertical parallax. In detail, an audio signal may be binaural rendered by applying only an HRTF corresponding to a path between the sound source and an ear which is closer to the sound source without applying an HRTF corresponding to a path between the sound source and an ear which is farther from the sound source.

Furthermore, the audio signal processing device may calculate the size of the sound source based on a directivity pattern of the audio signal corresponding to the sound source. This is because a radiation direction of the audio signal changes according to a frequency band. In detail, the audio signal processing device may differently calculate the size of the sound source for each frequency band. In a specific embodiment, the audio signal processing device may differently calculate the size of the sound source for each frequency band. For example, when the audio signal processing device performs binaural rendering on high-frequency band components in the audio signal corresponding to the sound source, the audio signal processing device may calculate a size of the sound source as a larger value than the size of the sound source calculated when the audio signal processing device performs binaural rendering on low-frequency band components. This is because an audio signal of a higher frequency band may have a narrower radiation width.

In the above-mentioned embodiment in which the audio signal processing device adjusts the IACC, the audio signal processing device may adjust the IACC of binaural-rendered 2-channel audio signals for each frequency band. In detail, the audio signal processing device may differently adjust a randomization degree of an HRTF applied to the 2-channel audio signals for each frequency band. In a specific embodiment, the audio signal processing device may set the phase randomization degree of an HRTF at a low-frequency band higher than the phase randomization degree of an HRTF at a high-frequency band.

Furthermore, the audio signal processing device may differentiate frequency bands based on at least one of an equivalent rectangular bandwidth (ERB), a critical band, or an octave band. Moreover, the audio signal processing device may use other various methods for differentiating frequency bands.

When performing binaural rendering on audio signals corresponding to a plurality of sound sources, the audio signal processing device may be required to individually apply a plurality of HRTFs respectively corresponding to the plurality of sound sources. Therefore, the amount of processing of the audio signal processing device may excessively increase. Here, the audio signal processing device may reduce the amount of processing for binaural rendering by substituting the plurality of sound sources with a single sound source having at least a certain size. This operation will be described with reference to FIG. 7.

Figure 7:
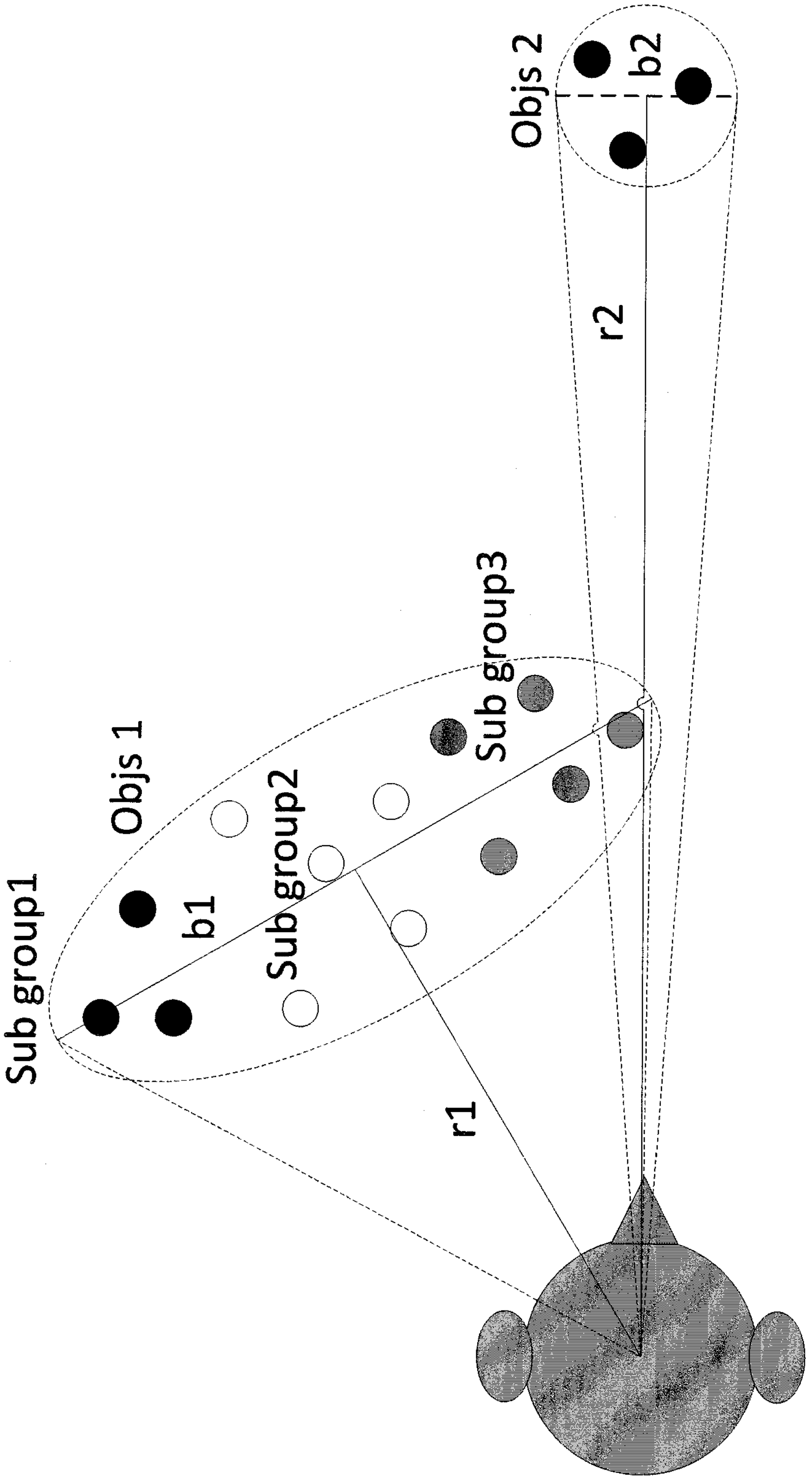
FIG. 7 illustrates a method in which the audio signal processing device according to an embodiment of the present invention processes a plurality of sound sources as a single sound source.

FIG. 7 illustrates a method in which the audio signal processing device according to an embodiment of the present invention processes a plurality of sound sources as a single sound source.

The audio signal processing device may substitute a plurality of sound sources with a single substitutive sound source, and may perform binaural rendering on an audio signal based on the distance from the listener to the substitutive sound source and the size of the substitutive sound source. Here, the audio signal processing device may calculate the size of the substitutive sound source based on the locations of the plurality of sound sources. In detail, the audio signal processing device may calculate the size of the substitutive sound source as the size of a space in which the plurality of sound sources exist. When performing binaural rendering on an audio signal based on the distance from the listener to the substitutive sound source and the size of the substitutive sound source, the audio signal processing device may perform binaural rendering on the audio signal by using the embodiments described above with reference to FIGS. 1 to 6. In detail, the audio signal processing device may perform binaural rendering on the audio signal by using HRTFs corresponding to both end points of the substitutive sound source. In another specific embodiment, the audio signal processing device may perform binaural rendering on the audio signal by selecting a plurality of points on the substitutive sound source and using a plurality of HRTFs respectively corresponding to the plurality of points.

Furthermore, when performing binaural rendering on the audio signal by using the substitutive sound source, the audio signal processing device may divide the plurality of sound sources into a plurality of groups, and may apply a delay for each of the plurality of groups. This is because audio signals may be generated at different times in the plurality of sound sources. For example, in a video in which a large number of zombies appear, the zombies may scream at slightly different times. Here, the audio signal processing device may divide the zombies into three groups and may apply a delay for each of the three groups.

Furthermore, the audio signal processing device may not treat the substitutive sound source as a dot not having a size regardless of whether the distance from the listener to the substitutive sound source is equal to or larger than a preset threshold value. This is because it is difficult to treat the substitutive sound source as a single dot even if the substitutive sound source is distant from the listener since the substitutive sound source substitutes the plurality of sound sources spaced far apart from each other.

In the example of FIG. 7, the audio signal processing device substitutes a plurality of sound sources, which are relatively distant, with a second object objs 2. In detail, the audio signal processing device may perform binaural rendering on audio signals corresponding to the plurality of sound sources based on a width b2 of the second object objs 2 and a distance r2 from the listener to the second object objs 2.

Furthermore, the audio signal processing device substitutes a plurality of sound sources, which are relatively near, with a first object objs 1. In detail, the audio signal processing device performs binaural rendering on audio signals corresponding to the plurality of sound sources based on a width b1 of the first object objs 1 and a distance r1 from the listener to the first object objs 2. The distance r1 from the listener to the first object objs 1 is smaller than the distance r2 from the listener to the second object objs 2. Furthermore, the width b1 of the first object objs 1 is larger than the width of the second object objs 2. Therefore, when performing binaural rendering on an audio signal corresponding to the first object objs 1, the audio signal processing device may represent a larger object than that represented when performing binaural rending on an audio signal corresponding to the second object objs 2.

Furthermore, the audio signal processing device may divide the plurality of sound sources into three groups, i.e., Sub group1, Sub group2, and Sub group3, and may perform, at different initiation times, binaural rendering on audio signals respectively corresponding to the three groups Sub group1, Sub group2, and Sub group3. Through these embodiments, the audio signal processing device may represent the three-dimensionality of the plurality of sound sources while reducing the load of binaural calculation.

Figure 8:
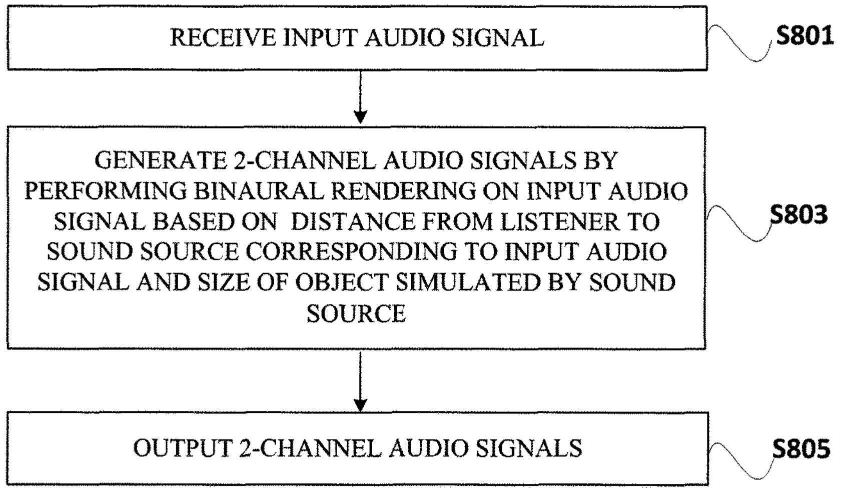
FIG. 8 illustrates operation of the audio signal processing device according to an embodiment of the present invention.

FIG. 8 illustrates operation of the audio signal processing device according to an embodiment of the present invention.

The audio signal processing device receives an input audio signal (S801). In detail, the audio signal processing device may receive the input audio signal through an input unit.

The audio signal processing device performs binaural rendering on the input audio signal based on the distance from the listener to a sound source corresponding to the input audio signal and the size of an object simulated by the sound source to generate 2-channel audio signals (S803). In detail, the audio signal processing device performs binaural rendering on the input audio signal based on the distance to the sound source and the size of the object simulated by the sound source to generate, by using a binaural renderer, the 2-channel audio signals.

A path from the listener to the sound source may represent a path from the center of the head of the listener to the sound source. Furthermore, the path from the listener to the sound source may represent a path from two ears of the listener to the sound source.

The audio signal processing device may determine a characteristic of an HRTF based on the distance from the sound source to the listener and the size of the sound source, and may perform binaural rendering on the audio signal by using the HRTF. In detail, the audio signal processing device may perform binaural rendering on the audio signal by using a plurality of HRTFs based on the distance from the sound source to the listener and the size of the sound source. Here, the binaural renderer may determine characteristics of the plurality of HRTFs based on the distance from the sound source to the listener and the size of the sound source. In detail, the audio signal processing device may perform binaural rendering on the input audio signal based on a pseudo HRTF. Here, the pseudo HRTF is generated based on an HRTF corresponding to the path from the listener to the sound source. In detail, the pseudo HRTF may be generated by adjusting the initial time delay of the HRTF based on the distance from the listener to the sound source and the size of the object simulated by the sound source. When the size of the object simulated by the sound source becomes larger in comparison with the distance from the listener to the sound source, the initial time delay used to generate the pseudo HRTF may also increase. Furthermore, the pseudo HRTF may be generated by adjusting phases between 2 channels of the HRTF based on the distance from the listener to the sound source and the size of the object simulated by the sound source. Furthermore, the pseudo HRTF may be generated by adjusting a level difference between 2 channels of the HRTF based on the distance from the listener to the sound source and the size of the object simulated by the sound source.

The audio signal processing device may filter the input audio signal by using the HRTF corresponding to the path from the listener to the sound source and the pseudo HRTF. Here, the audio signal processing device may determine a ratio between an audio signal filtered with the HRTF and an audio signal filtered with the pseudo HRTF based on the size of the object simulated by the sound source in comparison with the distance from the listener to the sound source. In detail, when the size of the object simulated by the sound source becomes larger in comparison with the distance from the listener to the sound source, the audio signal processing device may increase the radio of the audio signal filtered with the pseudo HRTF to the audio signal filtered with the HRTF based on the size of the object simulated by the sound source in comparison with the distance from the listener to the sound source.

The audio signal processing device may perform binaural rendering on an input signal by using a plurality of pseudo HRTFs. Here, the audio signal processing device may determine the number of pseudo HRTFs based on the distance from the listener to the sound source and the size of the object simulated by the sound source, and may perform binaural rendering on an input audio signal by using an HRTF and the determined number of pseudo HRTFs.

The audio signal processing device may process only an audio signal of a frequency band having a shorter wavelength than a preset maximum time delay from among audio signals filtered with a pseudo HRTF. In detail, the audio signal processing device may perform binaural rendering on the input audio signal by using the pseudo HRTF as described above with reference to FIG. 5.

The audio signal processing device may adjust the IACC between 2-channel audio signals generated through binaural rendering based on the distance from the listener to the sound source and the size of the object simulated by the sound source. In detail, the audio signal processing device may decrease the IACC between 2-channel audio signals generated through binaural rendering when the size of the object simulated by the sound source becomes larger in comparison with the distance from the listener to the sound source.

Furthermore, the audio signal processing device may randomize phases of HRTFs respectively corresponding to binaural-rendered 2-channel audio signals, so as to adjust the IACC between the binaural-rendered 2-channel audio signals. Furthermore, the audio signal processing device may adjust the IACC between the 2-channel audio signals by adding a signal obtained by randomizing the phase of the input signal and a signal obtained by filtering the input signal with an HRTF corresponding to the path from the listener to the sound source.

The audio signal processing device may adjust the IACC between binaural-rendered 2-channel audio signals for each frequency band. In detail, the audio signal processing device may adjust the IACC between binaural-rendered two channels for each frequency band based on the size of the sound source. In a specific embodiment, the audio signal processing device may adjust the IACC between binaural-rendered two channels for each frequency band based on the size of the sound source and the distance from the listener to the sound source. In detail, the audio signal processing device may adjust the IACC between binaural-rendered 2-channel audio signals at a frequency band in which an influence on a sound tone is small according to a characteristic of an input audio signal corresponding to the sound source. In detail, the audio signal processing device may adjust the IACC between binaural-rendered 2-channel audio signals using the embodiments described above with reference to FIG. 4.

Furthermore, the audio signal processing device may perform binaural rendering on an input audio signal by using a plurality of HRTFs corresponding to paths connecting a plurality of points on the sound source and the listener based on the distance from the listener to the sound source and the size of the object simulated by the sound source. Here, the audio signal processing device may select the plurality of HRTFs corresponding to paths from a plurality of points on the sound source to the listener based on the distance from the listener to the sound source and the size of the object simulated by the sound source. For example, the audio signal processing device may select the plurality of points on the sound source based on the size of the sound source, and may calculate an incidence angle corresponding to an HRTF based on the distance between each of the plurality of points and the listener and the radius of the head of the listener. The audio signal processing device may select HRTFs corresponding to the plurality of points on the sound source based on the calculated incidence angle.

In a specific embodiment, the audio signal processing device may process an audio signal for binaural rendering by using a plurality of HRTFs corresponding to paths from a plurality of points on the sound source to the listener based on the distance from the sound source to the listener and the size of the sound source. Here, the audio signal processing device may select the number of the plurality of points on the sound source based on the distance from the listener to the sound source and the size of the sound source. Moreover, the audio signal processing device may select the locations of the plurality of points on the sound source based on the distance from the listener to the sound source and the size of the sound source. For example, when the distance from the listener to the sound source exceeds a preset threshold value, the audio signal processing device may treat the sound source as a point source not having a size. Furthermore, when the distance from the listener to the sound source is smaller than the preset threshold value, the audio signal processing device may increase the number of points on the sound source as the distance from the listener to the sound source decreases.

In another specific embodiment, the audio signal processing device may select three HRTFs respectively corresponding to three points corresponding to both ends of the sound source and a center of the sound source. Here, the audio signal processing device may select, as the HRTFs corresponding to both ends of the sound source, HRTFs corresponding to larger incidence angles as the distance from the listener to the sound source decreases. In detail, the audio signal processing device may perform binaural rendering on an input audio signal by using a plurality of HRTFs corresponding to paths connecting a plurality of points on the sound source and the listener as described above with reference to FIG. 3.

Furthermore, the audio signal processing device may perform binaural rendering on an audio signal by substituting one sound source with a plurality of sound sources. Here, audio signals corresponding to the plurality of sound sources are localized at a location of the one sound source substituted with the plurality of sound sources. The audio signal processing device may use a plurality of HRTFs, and the plurality of HRTFs may respectively correspond to a plurality of paths connecting the listener and the plurality of sounds sources substituting one sound source. The number of the plurality of sound sources may be two. The audio signal processing device may substitute one sound source with an audio signal filtered with a plurality of HRTFs corresponding to a plurality of sound sources. Here, the plurality of sound sources output an audio signal localized at the location of the corresponding sound source. The audio signal processing device may adjust the distance between the plurality of sound sources substituting one sound source based on the distance from the listener to the sound source and the size of the sound source. In detail, when the relative size of the sound source becomes larger since the distance from the listener to the sound source decreases, the audio signal processing device may increase the distance between the plurality of sound sources based on the distance from the listener to the sound source and the size of the sound source. In detail, the audio signal processing device may perform binaural rendering on the input audio signal as described above with reference to FIG. 6.

Furthermore, when calculating the size of the object simulated by the sound source, the audio signal processing device may perform the following operation. The audio signal processing device may differently calculate the size of the object simulated by the sound source for each frequency band of the input audio signal. When the audio signal processing device performs binaural rendering on low-frequency band components in the input audio signal, the audio signal processing device may calculate a size of the object simulated by the sound source as a larger value than the size of the object simulated by the sound source calculated when the audio signal processing device performs binaural rendering on high-frequency band components. Furthermore, the audio signal processing device may calculate the size of the object simulated by the sound source based on the head direction of the listener. In detail, the audio signal processing device may calculate the size of the object simulated by the sound source based on the head direction of the listener and a direction in which the sound source outputs an audio signal.

Furthermore, the audio signal processing device may substitute a plurality of sound sources with a single substitutive sound source, and may perform binaural rendering on an audio signal based on the distance from the listener to the substitutive sound source and the size of the substitutive sound source. Here, the audio signal processing device may calculate the size of the substitutive sound source based on the locations of the plurality of sound sources. In detail, the audio signal processing device may calculate the size of the substitutive sound source as the size of a space in which the plurality of sound sources exist. In detail, the audio signal processing device may operate as described above with reference to FIG. 7.

The audio signal processing device outputs 2-channel audio signals (S805).

Embodiments of the present invention provide an audio signal processing device and method for binaural rendering.

In particular, embodiments of the present invention provide a binaural-rendering audio signal processing device and method for representing three-dimensionality which changes according to the size of an object simulated by a sound source.

Although the present invention has been described using the specific embodiments, those skilled in the art could make changes and modifications without departing from the spirit and the scope of the present invention. That is, although the embodiments of binaural rendering for multi-audio signals have been described, the present invention can be equally applied and extended to various multimedia signals including not only audio signals but also video signals. Therefore, any derivatives that could be easily inferred by those skilled in the art from the detailed description and the embodiments of the present invention should be construed as falling within the scope of right of the present invention.

What is claimed is:

1. An audio signal processing device for performing binaural rendering on an input audio signal, the audio signal processing device comprising:

a reception unit configured to receive the input audio signal;

a binaural renderer configured to generate a 2-channel audio by performing binaural rendering on the input audio signal; and an output unit configured to output the 2-channel audio, wherein the binaural renderer calculates a size of an object simulated by a sound source corresponding to the input audio signal based on a directivity pattern of the input audio signal, and performs binaural rendering on the input audio signal using a plurality of head related transfer functions (HRTFs) respectively corresponding to paths from a plurality of points on the object simulated by the sound source to a listener, wherein a characteristic of each HRTF is determined based on the size of the object.

2. The audio signal processing device of claim 1, wherein the binaural renderer determines the characteristic of each HRTF based on a distance from the listener to the object and the size of the object simulated by the sound source, and performs binaural rendering on the input audio signal using the HRTFs.

3. The audio signal processing device of claim 2, wherein at least one of the plurality of HRTFs is a pseudo HRTF generated by adjusting an initial time delay of an HRTF corresponding to a path from the listener to the object based on the distance from the listener to the object and the size of the object simulated by the sound source.

4. The audio signal processing device of claim 3, wherein, when the size of the object simulated by the sound source becomes larger in comparison with the distance from the listener to the object, the initial time delay used to generate the pseudo HRTF increases.

5. The audio signal processing device of claim 3, wherein the binaural renderer filters the input audio signal using the HRTF corresponding to the path from the listener to the object and the pseudo HRTF, and determines a ratio between an audio signal filtered with the pseudo HRTF and an audio signal filtered with the HRTF corresponding to the path from the listener to the object based on the size of the object simulated by the sound source in comparison with the distance from the listener to the object.

6. The audio signal processing device of claim 5, wherein, when the size of the object simulated by the sound source becomes larger in comparison with the distance from the listener to the object, the binaural renderer increases the ratio of the audio signal filtered with the pseudo HRTF to the audio signal filtered with the HRTF corresponding to the path from the listener to the object based on the size of the object simulated by the sound source in comparison with the distance from the listener to the object.

7. The audio signal processing device of claim 3, wherein the pseudo HRTF is generated by adjusting at least one of a phase between 2 channels of the HRTF or a level difference between the 2 channels of the HRTF based on the distance from the listener to the object and the size of the object simulated by the sound source.

8. The audio signal processing device of claim 3, wherein the binaural renderer determines number of the pseudo HRTFs based on the distance from the listener to the object and the size of the object simulated by the sound source, and uses the HRTF and a determined number of the pseudo HRTFs.

9. The audio signal processing device of claim 3, wherein the binaural renderer processes only an audio signal of a frequency band having a shorter wavelength than a preset maximum time delay from among audio signals filtered with the pseudo HRTF.

10. The audio signal processing device of claim 1, wherein the binaural renderer determines number of the plurality of points on the object based on the distance from the listener to the object and the size of the object simulated by the sound source.

11. The audio signal processing device of claim 1, wherein the binaural renderer determines locations of the plurality of points on the object based on the distance from the listener to the object and the size of the object simulated by the sound source.

12. The audio signal processing device of claim 1, wherein the binaural renderer adjusts an interaural cross correlation (IACC) between the 2-channel audio based on a distance from the listener to the object and the size of the object simulated by the sound source.

13. The audio signal processing device of claim 12, wherein, when the size of the object simulated by the sound source becomes larger in comparison with the distance from the listener to the object, the binaural renderer decreases the IACC between the 2-channel audio signals.

14. The audio signal processing device of claim 12, wherein the binaural renderer adjusts the IACC between the 2-channel audio signals by randomizing a phase of a head related transfer function (HRTF) corresponding to the 2-channel audio signals.

15. The audio signal processing device of claim 12, wherein the binaural renderer adjusts the IACC between the 2-channel audio signals by adding a signal obtained by randomizing a phase of the input audio signal and a signal obtained by filtering the input audio signal with a head related transfer function (HRTF) corresponding to a path from the listener to the object.

16. The audio signal processing device of claim 1, wherein the binaural renderer differently calculates the size of the object simulated by the sound source for each frequency band of the input audio signal.

17. The audio signal processing device of claim 16, wherein, when performing binaural rendering on relatively low frequency band components in the input audio signal, the binaural renderer calculates the size of the object simulated by the sound source as a larger value than the size of the object simulated by the sound source calculated when performing binaural rendering on relatively high frequency band components.

18. The audio signal processing device of claim 1, wherein the binaural renderer calculates the size of the object simulated by the sound source further based on a head direction of the listener.

19. An operation method of an audio signal processing device for performing binaural rendering on an input audio signal, the operation method comprising:

receiving the input audio signal;

calculating a size of an object simulated by a sound source corresponding to the input audio signal based on a directivity pattern of the input audio signal;

generating a 2-channel audio by performing binaural rendering on the input audio signal using a plurality of head related transfer functions (HRTFs) respectively corresponding to paths from a plurality of points on the object simulated by the sound source to a listener, wherein a characteristic of each HRTF is determined based on the size of the object; and outputting the 2-channel audio.

20. The operation method of claim 19, wherein the characteristic of each HRTF is determined based on a distance from the listener to the object and the size of the object.

* * * * *